United States Patent [19]

Chiba et al.

[11] Patent Number: 4,957,326
[45] Date of Patent: Sep. 18, 1990

[54] ROOF PANEL MOUNTING STRUCTURE

[75] Inventors: Koji Chiba, Yokosuka; Kensuke Uchida, Tokyo, both of Japan

[73] Assignee: Nissan Motor, Co. Ltd., Yokohama, Japan

[21] Appl. No.: 420,072

[22] Filed: Oct. 11, 1989

[30] Foreign Application Priority Data

Oct. 26, 1988 [JP] Japan ................... 63-270423

[51] Int. Cl.⁵ .............................................. B62D 25/06
[52] U.S. Cl. .................................. 296/210; 296/197; 296/203; 296/901
[58] Field of Search ................. 296/210, 203, 29, 196, 296/197, 901

[56] References Cited

U.S. PATENT DOCUMENTS

| 4,355,845 | 10/1982 | Ziegler et al. | 296/210 |
| 4,438,971 | 3/1984 | Zaydel et al. | 296/901 X |
| 4,874,200 | 10/1989 | Nasu et al. | 296/197 |

FOREIGN PATENT DOCUMENTS 242781 10/1988 Japan ................... 296/197

Primary Examiner—Margaret A. Focarino
Assistant Examiner—Gary C. Hoge
Attorney, Agent, or Firm—Pennie & Edmonds

[57] ABSTRACT

A roof panel mounting structure through which a roof panel is fixedly mounted on a vehicle body. The roof panel mounting structure is comprised of a roof rail forming part of the vehicle body. The roof rail is constructed of inner and outer panels which are joined with each other to form a hollow therebetween. A reinforcement member is fixedly disposed in a manner to traverse the hollow of the roof rail. The roof panel is made of plastic and integrally formed with a boss section projecting downwardly. A mounting bolt is inserted in the boss section and projects downwardly from the boss section. The boss section passes through the outer panel and projects downwardly near the reinforcement member, so that the mounting bolt is fixedly secured to the reinforcement member thereby to securely mount the roof panel on the vehicle body.

8 Claims, 1 Drawing Sheet

ROOF PANEL MOUNTING STRUCTURE

BACKGROUND OF THE INVENTION

1. Field of the Invention

The present invention relates to improvements in a roof panel mounting structure through which a roof panel of a vehicle is fixed to a roof rail forming part of a vehicle body.

2. Description of the Prior Art

Hitherto a roof panel mounting structure as shown in FIG. 3 of the drawing of the present application has been proposed as disclosed, for example, in Japanese Utility Model Provisional Publication No. 61-117775. In connection with this roof panel mounting structure, a vehicle body 1 includes a hollow roof rail 4' disposed below and along the roof panel 2'. The roof rail 4' is constituted by inner and outer panels 5', 6' which are joined to each other to form a generally closed cross-section. The roof panel is formed of plastic and integrally formed at its inner surface with a boss section 8' which projects downwardly and toward the outer panel 6' of the roof rail 4'. The boss section 8' is formed with a threaded hole 7' into which a bolt 9' is screwed passing through the outer panel 6', so that the roof panel 3 is fixedly secured to the outer panel 6' of the roof rail 4'.

However, with such a conventional roof panel mounting structure, the vertical length L' of the boss section 8 must be sufficiently large to securely retain the bolt 9. According to the present inventors' estimation, it is desirable that the vertical length L' of the boss section is at least 18 mm in order to securely retain the bolt 9'. Accordingly, assuming that the length L' of the boss section 8' is made sufficiently large without changing the height 8' of the roof panel 3' and the amount of displacement of the roof rail 4' toward the inside of a passenger compartment R', the outer panel 6' of the roof rail 4' is partly depressed downwardly at a portion opposite to the boss section 8' in order to receive the boss section 8'. This partly decreases the cross-sectional area S' of the roof rail 4', thereby lowering the rigidity of the roof rail 4'.

It is a matter of course that a sufficient length of the boss section 8' can be ensured without decreasing the cross-sectional area S' of the roof rail 4' if the roof rail 4' protrudes into the passenger compartment R', thereby reducing the effective volume of the passenger compartment R'.

SUMMARY OF THE INVENTION

It is an object of the present invention to provide an improved roof panel mounting structure which provides a high structural strength of a vehicle body without reducing the effective volume of a passenger compartment.

Another object of the present invention is to provide an improved roof panel mounting structure which makes possible to employ a roof panel provided with a boss section (for supporting a mounting bolt) having a sufficient length without partly reducing the cross-sectional area of the roof rail.

A further object of the present invention is to provide an improved roof panel mounting structure by which a sufficient mounting strength for a roof panel can be obtained without allowing a roof rail (to which the roof panel is supported) to project toward the inside of a passenger compartment.

A roof panel mounting structure according to the present invention is comprised of a boss section projected from the inner surface of a roof panel of a vehicle body. A bolt is fixedly inserted in the boss section. A roof rail is fixedly disposed under the roof panel and includes inner and outer panels which are joined with each other to define a hollow. The outer panel is formed with an opening in which the boss section is disposed. The boss section projects into the hollow of the roof rail. Additionally, a reinforcement member is disposed in the roof rail and fixedly connected to at least one of the inner and outer panels of the roof rail. The bolt is fixedly secured to the reinforcement member.

Accordingly, the boss section of the roof panel is received within the roof rail through the opening of the roof rail outer panel, and therefore it is not necessary to partly reduce the cross-section of the roof rail if the length of the boss section is sufficiently large to securely retain the mounting bolt. This makes equal the cross-sectional area of the roof rail throughout the length of the roof rail, thereby ensuring a sufficient rigidity of the roof rail.

As a result of thus recieving the boss section within the roof rail, it is not necessary to change the height of the roof panel and the projection amount of the roof rail toward the inside of a passenger compartment even if the boss section has a sufficient length, thereby ensuring a sufficient volume of the passenger compartment.

Additionally, by virtue of the reinforcement member which is disposed within the roof rail and to which the mounting bolt inserted in the boss section is secured, although the outer panel of the roof rail is partly formed into an opened cross-section due to the above-mentioned opening of the outer panel, a sufficient strength of the roof rail can be obtained.

DETAILED DESCRIPTION OF THE INVENTION

Figure 1:
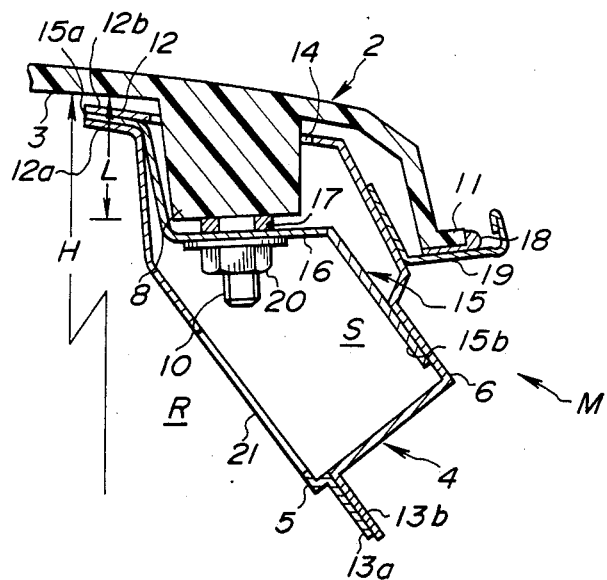
FIG. 1 is a fragmentary sectional view of an embodiment of a roof panel mounting structure in accordance with the present invention.
Figure 2:
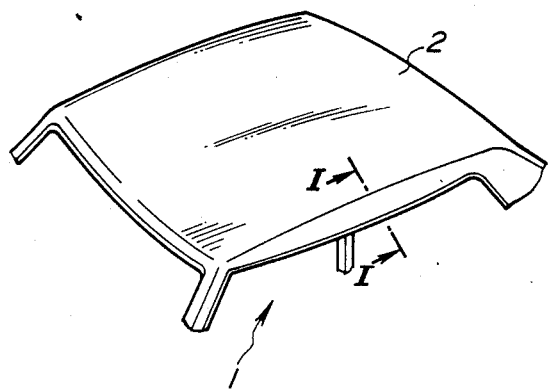
FIG. 2 is a fragmentary perspective view of a roof panel which is to be mounted on a vehicle body through the roof panel mounting 1 structue of FIG. 2, in which the sectional view of FIG. 1 is taken in the direction of arrows substantially along the line I—I.
Figure 3:
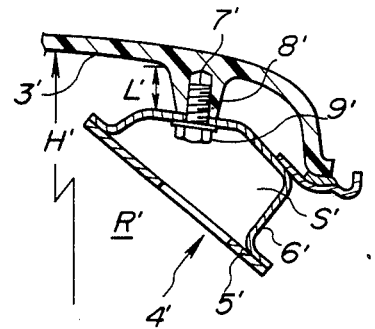
FIG. 3 is a cross-sectional view similar to FIG. 1 but showing a conventional roof panel mounting structure.

Referring now to FIGS. 1 and 2, an embodiment of a roof panel mounting structure according to the present invention is illustrated by the reference character M. The roof panel mounting structure M is arranged to securely connect a roof panel 2 to a roof rail 4 forming part of a vehicle body 1 of an automotive vehicle. The roof panel 2 is formed of plastic or synthetic resin and integrally formed with a boss section 8 which projects from the inner or lower surface 3 of the roof panel 2. The boss section 8 forms part of the roof panel mounting structure S. A mounting bolt 10 is inserted into the boss section 8 in such a manner that the upper part of the bolt 10 is embedded in the boss section 8. The lower part of the bolt 10 projects downwardly from the boss section 8. The roof panel 2 is integrally formed at its peripheral edge with a drip guide section 11 which extends outwardly.

A hollow roof rail 4 forming part of the vehicle body 1 is disposed under the roof panel 2 and generally laterally extends with respect to the vehicle. The roof rail 4 is constituted by inner and outer panels 5, 6. Each of the inner and outer panels 5, 6 is formed generally C-shaped in cross-section and formed with an upper flange 12a, 12b and a lower flange 13a, 13b. As shown, the upper flanges 12a, 12b of the inner and outer panels 5, 6 are fixedly joined with each other, and the lower flanges 13a, 13b of the inner and outer panels 5, 6 are fixedly joined with each other. Accordingly, the thus joined inner and outer panels 5, 6 constitute the hollow roof rail 4 having a generally closed cross-section. A channel-shaped member 19 is fixedly secured to the outer surface of the outer panel 6 to serve as a drip channel. The above-mentioned drip guide 11 of the roof panel 2 is fixed through adhesive 18 to the surface of the channel-shaped member 19. The outer panel 6 of the roof rail 4 is formed with an opening 14 having such a dimension that the boss section 8 can be disposed in the opening 14.

A reinforcing member 15 is fixedly disposed in the roof rail 4. The reinforcement member 15 has a flange section 15a which is fixedly put between the flange sections 12a, 12b of the inner and outer panels 5, 6. The lower section 15b of the reinforcement member 15 is fixedly secured to the inner surface of the outer panel 6. Thus, the reinforcing member 15 is disposed to traverse the hollow defined by the inner and outer panels 5, 6 of the roof rail 4 in order to reinforce the roof rail 4. The reinforcing member 15 has at its intermediate part a generally horizontal flat section 16 formed with a through-hole (not shown). The bolt 10 projecting from the boss section 8 passes through the through-hole and extends downwardly. A spacer 17 is disposed around the bolt 10 and between the boss section 8 and the reinforcing member flat section 16. In this state, the roof panel boss section 8 is disposed in the opening 14 of the roof rail outer panel 6. A tight connection between the reinforcement member flat section 16 and the bolt 10 is accomplished by tightening a nut 20. The tightening operation of the nut 20 is carried out through an operation hole 21 formed in the inner panel 5 under the bolt 10.

With the thus arranged embodiment, the boss section of the roof panel 2 protrudes into the roof rail 4 passing through the opening 14 of the roof rail outer panel 6. Accordingly, even if the length L of the boss section 8 is set sufficiently large to securely support the bolt 10, it is not required to partly depress the upper panel reducing the cross-sectional area S of the roof rail 4 containing the hollow. Thus, according to the embodiment, the cross-sectional area S of the roof rail 4 is kept equal throughout the whole length of the roof rail 4.

Additionally, as a result of protruding the boss section 8 into the roof rail 4, even if the boss section 8 has a sufficient length L, it is not necessary to change the height H of the roof panel 2 and the projection amount of the roof rail 4 into a passenger compartment R, thus obtaining a sufficient volume of the passenger compartment R.

Furthermore, since the reinforcement member 15 is disposed within the roof rail 4 to reinforce the roof rail 4, a sufficient rigidity can be obtained even if the roof rail 4 has partly an opened cross-section as indicated in FIG. 1 upon formation of the opening 14 in the outer panel 6 and of the operation hole 21 in the inner panel 5.

What is claimed is:

1. A roof panel mounting structure comprising:
   a boss section projected from inner surface of a roof panel of a vehicle body;
   a bolt fixedly inserted in said boss section;
   a roof rail fixedly disposed under said roof panel and including inner and outer panels which are joined with each other to define a hollow;
   means defining an opening in said outer panel, said boss section being disposed in said opening and projected into the hollow of said roof rail; and
   a reinforcement member disposed in said roof rail and fixedly connected to at least one of said inner and outer panels of said roof rail, said bolt being fixedly secured to said reinforcement member.

2. A roof panel mounting structure as claimed in claim 1, wherein said roof panel and said boss section are made of plastic and integral with each other.

3. A roof panel mounting structure as claimed in claim 1, wherein a part of said roof rail outer panel is located near said roof panel inner surface from which said boss section projects, said opening being formed at said part.

4. A roof panel mounting structure as claimed in claim 1, wherein said reinforcement member is fixedly disposed between said inner and outer panels of said roof rail in a manner to traverse the hollow inside the roof rail, the boss section projecting to said reinforcement member through said opening of said outer panel.

5. A roof panel mounting structure as claimed in claim 4, said reinforcement member has a generally horizontal flat section to which said bolt is fixedly secured.

6. A roof panel mounting structure as claimed in claim 1, wherein boss section projects generally vertically with respect to the vehicle body.

7. A roof panel mounting structure as claimed in claim 6, wherein said bolt is inserted into said boss section along axis of said boss section so as to project generally vertically with respect to the vehicle body.

8. A roof panel mounting structure as claimed in claim 1, further comprising a nut engaged with said bolt and located on the opposite side of the boss section with respect to said reinforcement member.

* * * * *